United States Patent [19]

Ostapchenko

[11] 4,303,573

[45] Dec. 1, 1981

[54] MOLDING BLENDS COMPRISING POLYESTER, IONOMER RESIN AND GRAFTED EPDM

[75] Inventor: George J. Ostapchenko, Wilmington, Del.

[73] Assignee: E. I. Du Pont de Nemours and Company, Wilmington, Del.

[21] Appl. No.: 223,212

[22] Filed: Jan. 7, 1981

[51] Int. Cl.³ ................... C08L 67/02; C08L 23/26
[52] U.S. Cl. .................................. 260/40 R; 525/64; 525/74; 525/75; 525/78
[58] Field of Search ............... 525/64; 260/40 R

[56] References Cited

U.S. PATENT DOCUMENTS 4,172,859  10/1979  Epstein .................. 428/402

Primary Examiner—Carman J. Seccuro

[57] ABSTRACT

A molding blend of polyethylene terephthalate, a selected ionomeric terpolymer and a selected graft terpolymer provides molded articles of good toughness.

8 Claims, No Drawings

MOLDING BLENDS COMPRISING POLYESTER, IONOMER RESIN AND GRAFTED EPDM

FIELD OF THE INVENTION

This invention relates to polyethylene terephthalate molding resins and more particularly to such resins that have good resistance to high velocity impact.

BACKGROUND OF THE INVENTION

Plastic structures have recently gained importance in automotive uses. The strengthening of plastic materials in order to withstand automotive impact forces is continually sought by research personnel. Polyethylene terephthalate has potential in molded plastic automotive parts, but its brittleness on impact can be improved.

SUMMARY OF THE INVENTION

In this invention the susceptibility of polyethylene terephthalate to crack in a brittle fashion on impact is lessened by adding to the polyethylene terephthalate of two additives; namely, an ionomeric terpolymer which is the zinc salt of a terpolymer of ethylene, methacrylic acid, and isobutyl acrylate; and a second terpolymer of ethylene, propylene, and 1,4-hexadiene which has succinate groups pendant from the copolymer chain.

Specifically the molding blend of this invention consists essentially of (a) polyethylene terephthalate, (b) 2 to 20% by weight of blend of an ionomeric terpolymer consisting of 60 to 99% by weight ethylene, 0.5 to 20% by weight methacrylic acid, and 0.5 to 20% by weight isobutyl acrylate, in which the acid moieties are neutralized to the extent of 5 to 100% with divalent metallic cations, preferably zinc ions, (c) 2 to 20% by weight of blend of a second terpolymer of 60 to 90% by weight of ethylene, 10 to 38% propylene, 2 to 10% by weight, 1,4-hexadiene and 0 to 5% by weight, 2,5-norbornadiene which has 0.2 to 9% by weight succinic groups appended to the terpolymer chain.

DESCRIPTION OF THE INVENTION

The polyethylene terephthalate resin employed herein is well known in the art, and has an inherent viscosity of at least 0.4 deciliters/g, and preferably 0.5–3.0 deciliters/g. It is film and fiber forming. Inherent viscosity (IV) is measured as described in U.S. Pat. No. 4,172,859.

The ionomeric terpolymer can be prepared as described in U.S. Pat. No. 3,264,272. The second terpolymer can be prepared by grafting maleic or fumaric acid groups to the terpolymer, as described in U.S. Pat. No. 4,010,223, to obtain succinic groups, namely, a mixture of succinic anhydride and succinic acid, grafted to the terpolymer. The average particle size of the particles of terpolymers (b) and (c) individually or together (i.e., in agglomerated form) in the blends of this invention should be below 3 microns in order to achieve good resistance to high velocity impact, and preferably the average is between 0.1–3 microns. The terpolymers may agglomerate with themselves or with each other and, in such event, the average agglomerate particle size should be below 3 microns.

The blends can be prepared by dry blending, such as tumbling together. The blend is then either extruded into cubes or directly extruded into molded form, such as sheet. Alternatively, the ingredients can be melt blended by melting one or two of the ingredients, then adding the remaining ingredients.

The compositions of the invention may be modified by incorporation of conventional additives such as fillers (e.g., mica) or reinforcing agents (e.g., glass fibers) up to 40% by weight; thermal, UV, and oxidative stabilizers, dyes, lubricants, pigments, flame retardants and the like.

EXAMPLE

A. A blend of the materials described in the table were prepared by mixing and tumbling in a polyethylene bag.

B. 60 mil thick sheeting was prepared by extruding the blend prepared in Part A using a 28 mm Werner-Pfleiderer twin screw extruder at 280° C. and a three-roll finisher for quenching. The sheeting was then heated to 150° C. for 1 minute to crystallize the polyethylene terephthalate. The crystallized sheeting samples were then tested at room temperature using a Rheometrics Impact Tester using impact velocities of 30, 3,000 and 30,000 inches per minute (ipm). The results are summarized in Table I.

TABLE I
IMPACT TEST RESULTS

| Composition % by weight | Impact Energy in-lbs* | | |
|---|---|---|---|
| | 30 ipm | 3000 ipm | 30,000 ipm |
| 17.2% ionomeric terpolmer** 82.8% PET (0.72IV) | 141 | 153 | shattered |
| 17.2% second terpolymer*** 82.8% PET (0.72IV) | 84 | 94 | shattered |
| 8.6% ionomeric terpolymer** 8.6% second terpolymer 82.8% PET (0.72IV) | 137 | 149 | 115 |

*The energy in in-lbs necessary to puncture the sheet sample.
**ethylene/methacrylic acid/isobutyl acrylate, 73% neutralized with zinc ions. (80/10/10)
***ethylene/propylene/1,4-hexadiene/norbornadiene (68/26/6/0.15 containing 1.4% succinic groups)

The 30,000 ipm is about 30 miles per hour velocity. Thus the compositions of this invention may be compression molded or thermoformed into parts useful in exterior automotive applications such as body panels and the like.

I claim:

1. A molding blend consisting essentially of
   (a) polyethylene terephthalate,
   (b) 2 to 20% by weight of blend of an ionomeric terpolymer consisting of 60 to 99% by weight ethylene, 0.5 to 20% by weight methacrylic acid, and 0.5 to 20% by weight isobutyl acrylate, in which the acid moieties are neutralized to the extent of 5 to 100% with divalent metallic cations,
   (c) 2 to 20% by weight of blend of a second terpolymer of 60 to 90% by weight ethylene, 10 to 38% by weight propylene, 2 to 10% by weight 1,4-hexadiene and 0 to 5% by weight 2,5-norbornadiene which has 0.2 to 9% by weight succinic groups appended to the terpolymer chain.

2. The molding blend of claim 1 wherein the ionomeric terpolymer and the second terpolymer individually or together have a particle size less than 3.0 micron.

3. Articles molded from the blends of claim 1 or 2.

4. Articles extruded from the blends of claim 1 or 2.

5. An article of claim 4 wherein the article is a sheet.

6. The blend of claim 1 or 2 which additionally contains 1–40% by weight of blend of a filler.

7. The blend of claim 6 wherein the filler is mica.

8. The blend of claim 1 or 2 wherein the divalent metallic cation is zinc.

* * * * *